Feb. 19, 1952

G. H. COLLIER 2,586,518

MECHANICAL AIRCRAFT BRAKE

Filed Sept. 11, 1948

INVENTOR.
GEORGE H. COLLIER

BY

ATTORNEY

Feb. 19, 1952     G. H. COLLIER     2,586,518
MECHANICAL AIRCRAFT BRAKE
Filed Sept. 11, 1948     3 Sheets-Sheet 3

INVENTOR.
GEORGE H. COLLIER
BY
ATTORNEY

Patented Feb. 19, 1952

2,586,518

UNITED STATES PATENT OFFICE 2,586,518

MECHANICAL AIRCRAFT BRAKE

George H. Collier, Cuyahoga Falls, Ohio, assignor to Wingfoot Corporation, Akron, Ohio, a corporation of Delaware Application September 11, 1948, Serial No. 48,902

2 Claims. (Cl. 188—72)

This invention relates to mechanical brakes, especially to a mechanical aircraft brake as adapted to be positioned inside of an aircraft wheel unit and be connected by a cable or other control unit to means for operating the brake.

The general object of the present invention is to provide a relatively compact, sturdy, mechanical brake which is particularly adapted for use on aircraft or other similar vehicles.

Another object of the invention is to provide a relatively simple brake which is made from a minimum of operative parts and which has a rugged construction.

A further object of the invention is to provide an effective braking action by use of an uncomplicated mechanical control means for the brake.

The foregoing and other objects and advantages of the invention will be made more apparent as the specification proceeds.

Attention is now directed to the accompanying drawings, wherein:

Fig. 1 is a vertical section of a mechanical brake embodying the principles of the invention, which section is taken on line 1—1 of Fig. 2;

Figs. 2 and 3 are transverse sections taken on lines 2—2 and 3—3 of Fig. 1;

Figure 1:
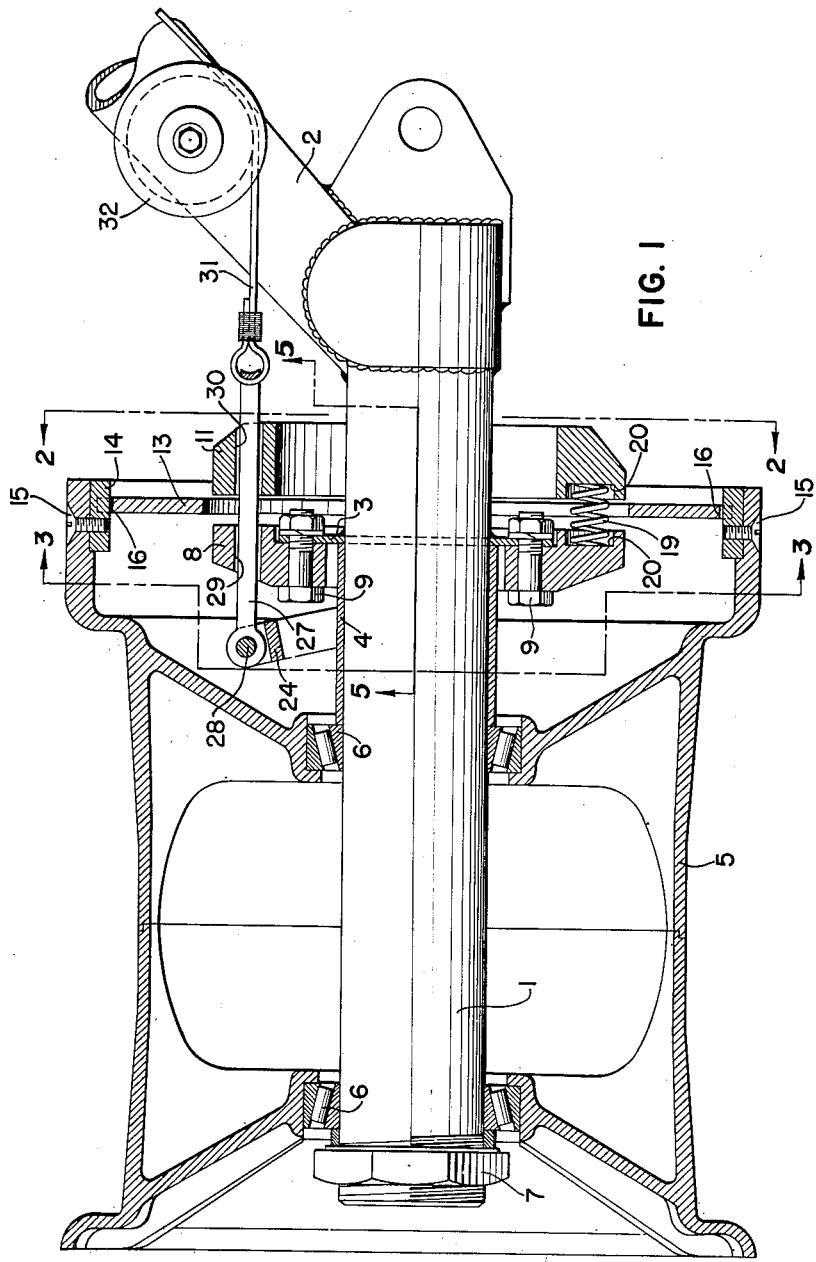

The present invention, broadly speaking, relates to a mechanical brake wherein one brake plate is in a fixed position inside of a vehicle wheel on the axle thereof and a second axially movable brake plate is associated with the fixed brake plate on the axially inner surface of same with a brake disc being received between the two brake plates and being in axial alignment with a portion of same although the brake plates extend radially inwardly from the brake disc. The brake plates are in loose engagement with each other and cam means are associated with the members securing the brake plates together. Lever operating means are provided for the cam means, and a control member extends axially outwardly of the vehicle wheel to a control member that connects thereto whereby the brakes can be actuated from a point externally of the brake to provide braking action when desired.

Reference now will be made to the details of the construction shown in the accompanying drawings and an axle 1 is shown which is secured to a suitable frame member 2 of the aircraft or other vehicle with which the brake of the invention is associated. The axle has a torque flange or plate 3 fixedly secured thereto while a spacing sleeve 4 is shown abutted against the axially outer surface of the flange 3 and this spacing sleeve 4 serves to determine the position of a circumferentially split aircraft wheel 5 on the axle 1. The wheel 5 is positioned on the axle 1 by means of conventional bearings 6 and a lock nut 7 is shown for retaining the split wheel 5 in desired engagement with the axle 1.

Figure 2:
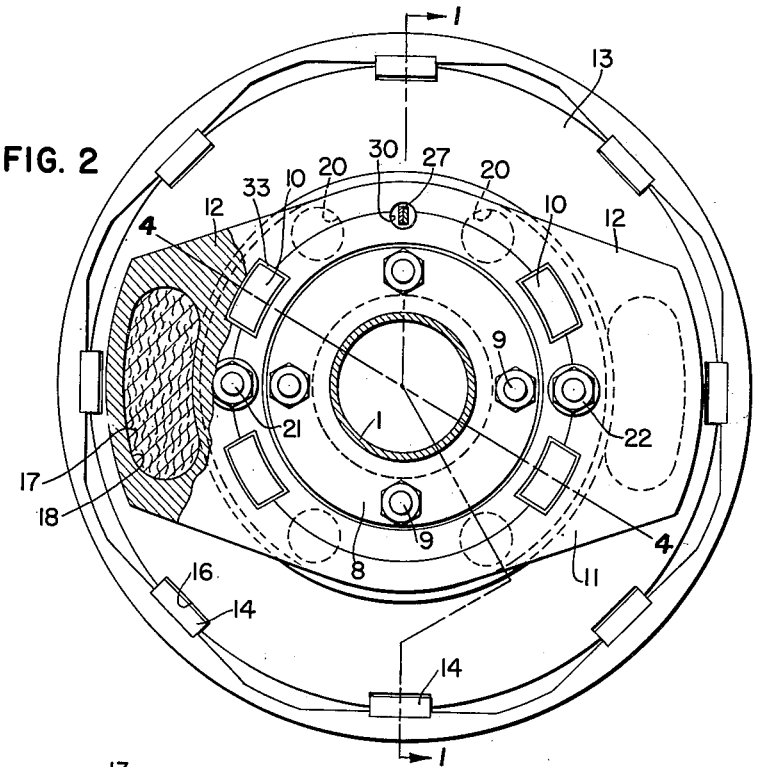
Figure 3:
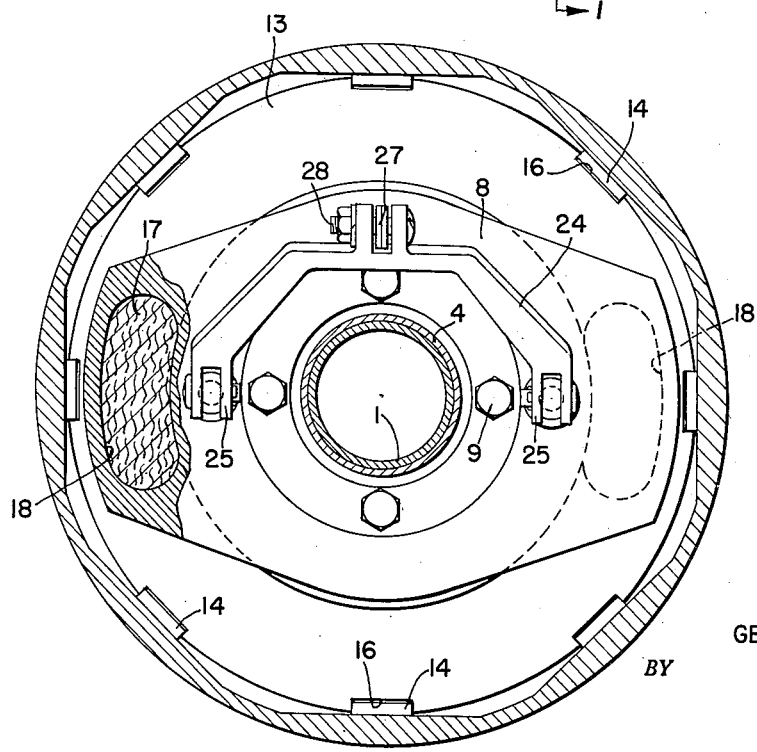
Figure 4:
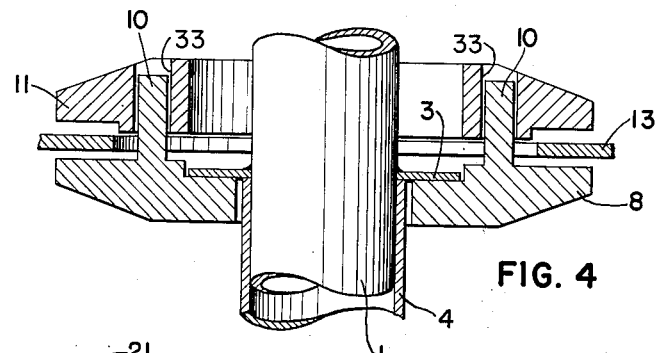
Fig. 4 is a fragmentary transverse section taken on line 4—4 of Fig. 2.
Figure 6:
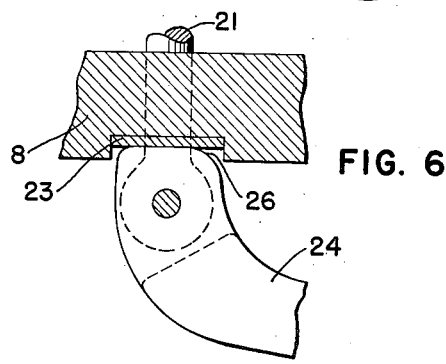
Fig. 6 is a fragmentary vertical section taken on line 6—6 of Fig. 5.
Figure 5:
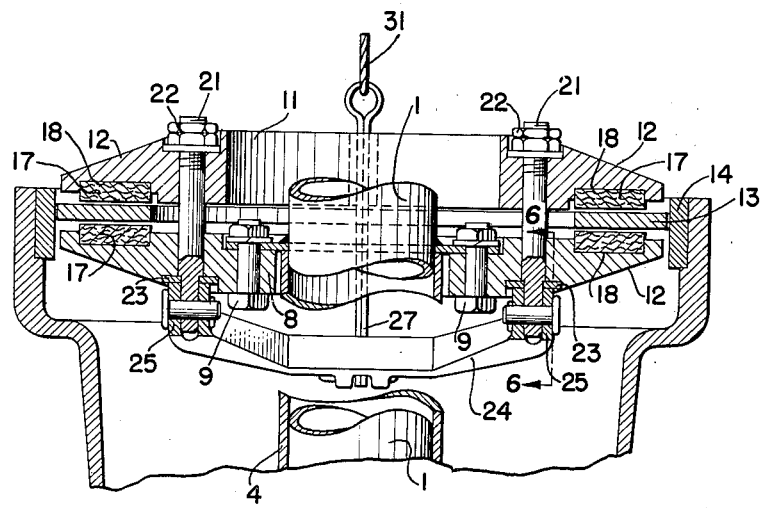
Fig. 5 is a fragmentary horizontal section taken on line 5—5 of Fig. 1.

The actual brake members of the invention are shown as comprising a fixed brake plate 8 which is bolted or otherwise secured to the torque flange 3 by means of bolts 9. The fixed plate 8 preferably is provided with a plurality of axially directed positioning fingers or lugs 10, as shown in Fig. 4, that are formed on circumferentially spaced and balanced portions of the fixed plate 8. These positioning lugs 10 are provided to retain a movable brake plate 11 in axial alignment with the fixed plate 8 on the axial inner surface of same. As best shown in Figs. 2 and 3, both of the plates 8 and 11 have diametrically opposed, radially outwardly extending brake block receiving portions or lugs 12 formed thereon. These lugs 12 extend radially outwardly of the brake of the invention to a point within the axial projection of a brake disc 13 which is carried by the split wheel 5 at the axial inner end thereof for rotation therewith but which is movable axially of the wheel. This connection between the brake disc 13 and the wheel 5 may comprise or use a plurality of keys 14 which are retained in engagement with the wheel 5 by means of screws 15 to engage the keys 14 with recesses 16 formed in the periphery of the brake disc 13. The brake disc 13, as best shown in Fig. 5, extends radially inwardly of a point in the brake until the major portion of the lugs 12 are covered by an axial projection of the brake disc 13. The lug portions 12 of the brake plates are adapted to position brake blocks or members 17 therein in recesses 18 that are formed on the adjacent faces of the brake plates 8 and 11.

Braking clearance is provided between the brake plates 8 and 11 by any conventional means, and the use of resilient coil springs 19 is shown for automatically and normally establishing braking clearance between the brake plates and any brake block means carried therein. These springs 19 may be seated in recesses 20 formed in the faces of the brake plates, and, of course, are symmetrically spaced circumferentially of the brake of the invention to equalize the brake clearance action.

As shown in Fig. 5, the brake plates 8 and 11 are usually loosely secured together by conventional means which may include the use of a pair of eye-bolts 21 which are at diametrically opposed portions of the brake. These eye-bolts 21 extend axially through the radially inner portions of the plates 8 and 11, and the axially outer ends of the bolts 21 receive nuts 22 for retaining the outer ends of the eye-bolts 21 in engagement with the movable brake plate 11 whereas the inner ends of the bolts 21 may have washers 23 carried thereby which are positioned between the head of the eye-bolts and the adjacent surface of the fixed brake plate 8.

As a special feature of the invention, relatively simple but rugged control means are provided for forcing the movable brake plate 11 and the brake disc 13 axially inwardly of the brake of the invention to effect brake action, when desired. Thus, a relatively U-shaped lever, or yoke member 24 is provided with ends 25 which are bifurcated and are adapted to straddle the heads of the eye-bolts 21. The ends 25 of the lever 24 preferably have cam surfaces 26 provided thereon whereby arcuate or rocking movement of the lever 24 will abut the washer 23 against the fixed plate 8 to force the eye-bolts 21 to move axially outwardly of the brake of the invention and force the movable brake plate 11 and brake disc 13 into contact with each other and the fixed brake plate 8 through the brake blocks 17 carried in such brake plate means. The control action for the lever 24 is preferably provided by means of a link 27 that pivotally connects to the lever 24, as by a pin 28 and that extends through the axially aligned holes 29 and 30 provided in the fixed brake plate 8 and movable plate 11, respectively. Thus, this link 27 may connect at its inner end to a flexible cable 31 which extends over a pulley or sheave 32 that is journaled on the aircraft frame 2 and leads the cable 31 to a suitable control means for the brake of the invention. The aligning lugs 10 on the fixed plate 8 may be of any desired shape and the plate 11 has complementary shaped recesses 33 formed therein for receipt of the lugs 10.

In some instances, it may be desired to avoid the formation of the integral positioning lugs 10 on the fixed brake plate 8 so that removable bearing means or aligning means may be secured between the brake plates in order to retain them fixed with relation to each other to aid in aligning same about the axle 1 for brake action. The eye-bolts 21 may sometimes serve as the sole aligning devices. In some constructions, it also may be desired to provide separate cams from the lever 24 but the use of the integral cam surface on this lever aids in providing an effective, sturdy brake control action. It will be noted that the brake control link 27 extends axially inwardly of the aircraft from the brake to permit control of an internal brake from an external point in a relatively simple manner. Furthermore, the brake of the invention is easily adjustable from the outside by the nuts 22 to take up any slack as brake block wear occurs. The entire construction of the brake of the invention is uncomplicated, can be made from inexpensive, easily formed parts whereby the objects of the invention are achieved.

While in accord with the patent statutes, one best known embodiment of the invention has been illustrated and described in detail, it is to be particularly understood that the invention is not to be limited thereto or thereby, but that the scope of the invention is defined in the appended claims.

What is claimed is:

1. A mechanical brake for light airplanes and including a horizontal axle, an angularly inclined outrigger supporting the axle, a hub-like wheel rotatably supported on the axle, a hollow center disc feathered at its periphery to the side of the wheel adjacent the outrigger, a substantially oval-shaped brake plate fixed to the axle between the disc and the wheel, a second substantially oval-shaped brake plate slidably mounted on the fixed brake plate but on the outrigger side of the disc, a forked lever straddling the axle between the fixed brake plate and the wheel, bolts connecting the brake plates together and connected to the forked ends of the lever, cam means carried by the forked ends of the lever and engaging the fixed brake plate whereby arcuate movement of the unforked end of the lever towards the fixed brake plate will pull on the bolts and move the movable brake plate against the disc, a pulley rotatably mounted on the outrigger, a cable extending around the pulley and through holes in the movable and fixed brake plates and connected to the lever, and coiled compression springs normally holding the movable brake plate away from the fixed brake plate.

2. A mechanical brake for light airplanes and including an axle, an outrigger supporting the axle, a wheel rotatably supported on the axle, a hollow center disc feathered at its periphery to the side of the wheel adjacent the outrigger, a substantially oval-shaped brake plate fixed to the axle between the disc and the wheel, a second substantially oval-shaped brake plate slidably mounted on the fixed brake plate but on the outrigger side of the disc, a forked lever straddling the axle between the fixed brake plate and the wheel, bolts connecting the brake plates together and connected to the forked ends of the lever, cam means carried by the forked ends of the lever and engaging the fixed brake plate whereby arcuate movement of the unforked end of the lever towards the fixed brake plate will pull on the bolts and move the movable brake plate against the disc, a cable extending through holes in the movable and fixed brake plates and connected to the lever, and resilient means normally holding the movable brake plate away from the fixed brake plate.

GEORGE H. COLLIER.

REFERENCES CITED

The following references are of record in the file of this patent:

UNITED STATES PATENTS

| Number | Name | Date |
| --- | --- | --- |
| 1,869,479 | Hofer | Aug. 2, 1932 |
| 1,947,272 | Napolian | Feb. 13, 1934 |
| 1,959,049 | Buns | May 15, 1934 |
| 2,130,785 | Bergland | Sept. 20, 1938 |
| 2,319,231 | Hawley | May 18, 1943 |
| 2,371,158 | Eby | Mar. 13, 1945 |
| 2,435,465 | Brown | Feb. 3, 1948 |